United States Patent
Linnen et al.

(10) Patent No.: US 12,436,708 B2
(45) Date of Patent: Oct. 7, 2025

(54) SOLID-STATE DRIVE SECURE DATA WIPING FOR REUSE AND RECYCLING

(71) Applicant: Sandisk Technologies, Inc., Milpitas, CA (US)

(72) Inventors: Daniel J. Linnen, Limestone, TN (US); Ramanathan Muthiah, Bangalore (IN); Preston Thomson, Boise, ID (US); Kirubakaran Periyannan, Saratoga, CA (US); Niles Nian Yang, Mountain View, CA (US); Inez Hua, Palo Alto, CA (US); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 214 days.

(21) Appl. No.: 18/230,145

(22) Filed: Aug. 3, 2023

(65) Prior Publication Data
US 2025/0004660 A1    Jan. 2, 2025

Related U.S. Application Data

(60) Provisional application No. 63/523,889, filed on Jun. 28, 2023.

(51) Int. Cl.
*G11C 11/00* (2006.01)
*G06F 3/06* (2006.01)

(52) U.S. Cl.
CPC ............ *G06F 3/0652* (2013.01); *G06F 3/062* (2013.01); *G06F 3/0679* (2013.01)

(58) Field of Classification Search
CPC ....... G06F 3/0652; G06F 3/062; G06F 3/0679
See application file for complete search history.

(56) References Cited

U.S. PATENT DOCUMENTS 9,042,186 B2 * 5/2015 Hsieh ................. G11C 16/3418
                                                              365/185.29
9,111,621 B2   8/2015 Krutzik et al.
(Continued)

OTHER PUBLICATIONS

Jain, Abhishek, Securely Erase An Encrypted Drive And Make It Reusable, Bitraser, Updated on Jul. 5, 2022, 4 pages, Stellar Information Technology Pvt. Ltd., downloaded at https://www.bitraser.com/article/securely-wipe-an-encrypted-drive.php.

(Continued)

*Primary Examiner* — Pho M Luu
(74) *Attorney, Agent, or Firm* — Crowell & Moring LLP

(57) ABSTRACT

A process for reliably erasing data from a solid-state drive (SSD) includes first, prior to user data being stored on the drive, generating a restore image of information stored on the drive which characterizes a restore state of the drive, such as a factory image. Then, imparting energy to the drive to promote electrons representing bits in corresponding memory cells to exit the cells, such as imparting thermal energy or high-energy electromagnetic radiation to the drive. Also, generating a set of quantitative data for verifying erasure of the data for presentation to the user helps ensure trust in the data wipe process. The drive may also be electrically erased prior to imparting energy to the SSD, to provide another level of confidence in the data wipe process. The restore image may then be loaded to the necessary locations on the wiped drive to restore drive functionality.

20 Claims, 2 Drawing Sheets

(56) References Cited

U.S. PATENT DOCUMENTS

| | | | |
|---|---|---|---|
| 9,818,486 | B2 | 11/2017 | Ziperovich |
| 10,297,324 | B2 | 5/2019 | Shen et al. |
| 10,592,110 | B2 | 3/2020 | Camp et al. |
| 2011/0154060 | A1 | 6/2011 | Guyot et al. |
| 2015/0026391 | A1* | 1/2015 | Su .................. G06F 12/0253 711/103 |
| 2015/0206584 | A1* | 7/2015 | Tsai .................. G11C 29/42 711/103 |
| 2016/0300618 | A1 | 10/2016 | Ziperovich |
| 2019/0018986 | A1 | 1/2019 | Choi et al. |
| 2022/0413737 | A1 | 12/2022 | Veluswamy et al. |
| 2023/0154542 | A1 | 5/2023 | Park et al. |

OTHER PUBLICATIONS

Ernst, Russ, SSD Erasure: What Enterprises Need to Know, Sep. 25, 2019, 10 pages, Blancco Technology Group, downloaded at https://www.blancco.com/resources/blog-what-do-you-really-know-about-ssd-erasure/.

Wei, Michael et al. Reliably Erasing Data From Flash-Based Solid State Drives, 13 pages, downloaded as early as Apr. 12, 2023 at https://www.usenix.org/legacy/event/fast11/tech/full_papers/Wei.pdf?ref=https://githubhelp.com.

Freeman, Michael et al., Secure State Deletion: Testing the efficacy and integrity of secure deletion tools on Solid State Drives, Edith Cowan University Research Online, 7th Australian Digital Forensics Conference, Edith Cowan University, Perth Western Australia, Dec. 3, 2009, pp. 32-40, This Conference Proceeding is posted at Research Online https://ro.ecu.edu.au/adf/65.

Pavlovic, Dwight, How To Secure Erase An SSD Drive _ HP Tech Takes, Mar. 3, 2020, pp. 1-6, downloaded at https://www.hp.com/us-en/shop/tech-takes/how-to-secure-erase-ssd.

Diesburg, Sarah M. et al., TrueErase_Per-file secure deletion for the storage data path, Dec. 2012, 11 pages, ACM, downloaded at https://www.researchgate.net/profile/An-I-Wang-2/publication/261847889_TrueErase_Per-file_secure_deletion_for_the_storage_data_path/links/5485ff070cf289302e2be128/TrueErase-Per-file-secure-deletion-for-the-storage-data-path.pdf.

Wang, Wei-Chen et al., Challenges and Designs for Secure Deletion in Storage Systems, Indo—Taiwan 2nd International Conference on Computing, Analytics and Networks (Indo—Taiwan ICAN2020) held at National Chung Cheng University, Taiwan (Feb. 7-8, 2020) and Chitkara University, India (Feb. 14-15, 2020), pp. 181-189, IEEE.

Kissel, Richard et al., Guidelines for Media Sanitization, NIST Special Publication 800-88 Revision 1, Dec. 2014, 64 pages, National Institute of Standards and Technology.

* cited by examiner

SOLID-STATE DRIVE SECURE DATA WIPING FOR REUSE AND RECYCLING

FIELD OF EMBODIMENTS

Embodiments of the invention may relate generally to data storage systems, and particularly to approaches to securely wiping a solid-state drive.

BACKGROUND

An SSD (solid-state drive) is a type of data storage device configured to store data persistently on interconnected non-volatile solid-state flash memory chips, which can be electrically erased and reprogrammed. Two main types of flash memory are NAND (NOT-AND) flash and NOR flash, named for the NAND and NOR logic gates, respectively. Both types of flash commonly utilize floating gate transistors (FGTs), including charge trap cells, to each hold an electrical charge representing a single bit of data, e.g., "1" for a charged cell or "0" for a cell having no electrical charge. SSDs typically may use single-, multi-, and/or triple-level cells, where single-level cells (SLC) can hold one bit of data at a time, multi-level cells (MLCs or alternatively, double-level cells) can hold two bits of data per cell, and triple-level cells (TLCs) can hold three bits of data in a cell, and so on.

With the propagation of robust digital data storage, the desired corollary is robust and reliable data erasure (or "wiping" of a data storage device). The reliability and trustworthiness of digital data erasure is especially important in the context of storage device reuse and recycling, where protecting one's data from others is paramount. In the context of magnetic-recording hard disk drives (HDDs), when a customer degausses a standard HDD the data is wiped from the drive, without question. This enables recycling with confidence that the drive is leaving the data center with no data. However, with SSDs this level of confidence may exist as well, but it may not be merited.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
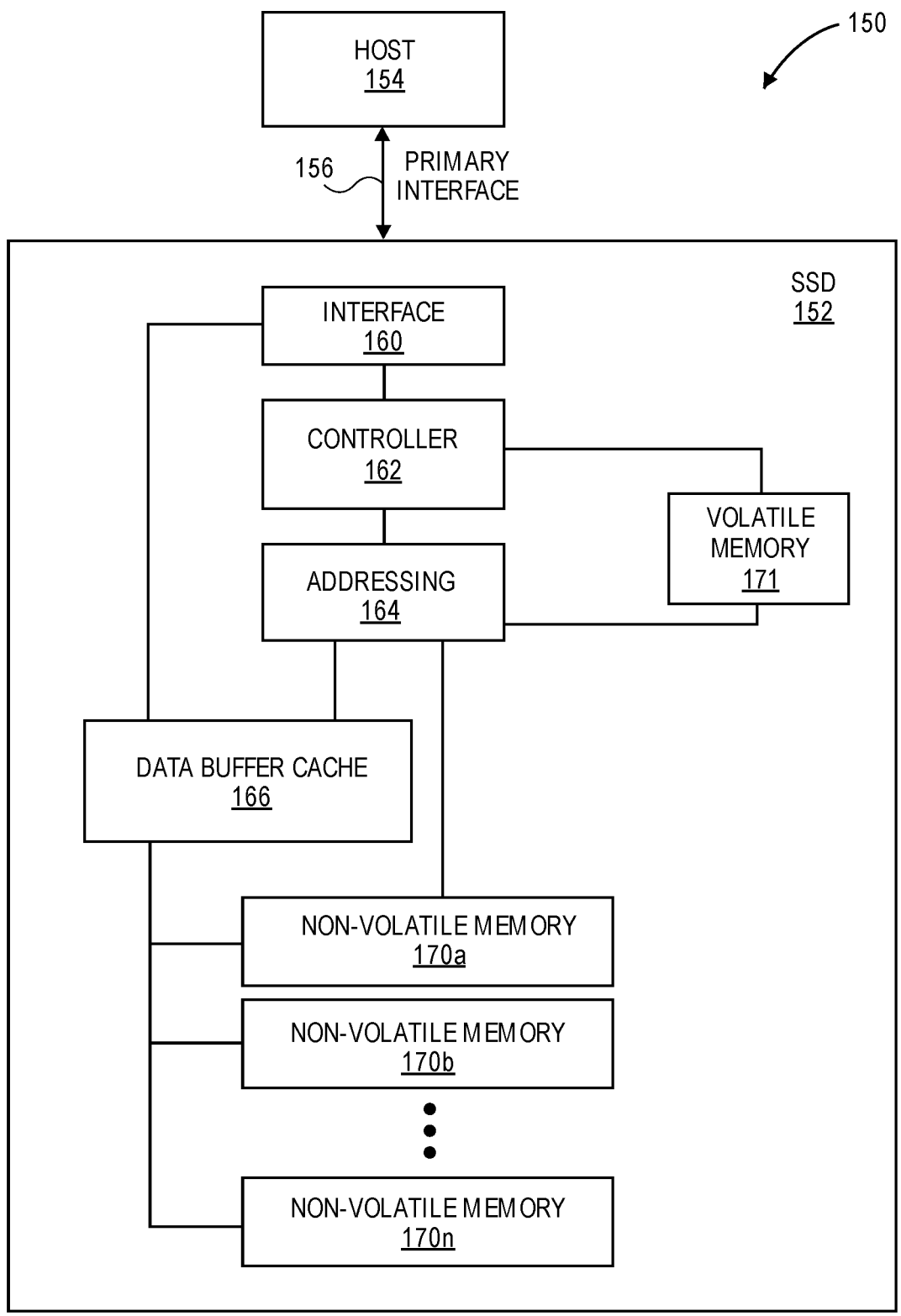
FIG. 1 is a block diagram illustrating a solid-state drive (SSD), according to an embodiment.

Approaches to reliably erasing data from a solid-state drive (SSD) in a trustworthy manner are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that the reliability and trustworthiness of digital data erasure is considered important, such as in the context of storage device reuse and recycling, where protecting one's data from others is paramount. Known approaches to erasing, or "wiping", a solid-state drive (SSD) include erasing encryption keys corresponding to data stored in encrypted form on the SSD, and "electrically wiping" whereby the stored data is electrically erased or written over. With respect to wiping encryption keys, this methodology is fading in use and popularity because as the power of computing progresses and technologies such as quantum computing emerge, there is an increasing likelihood that wiping the keys will not completely protect the stored data to the desired degree of confidence. With respect to electrically wiping, this is considered a fairly secure method but one problem is that the data erasure is carried out by the device itself, requiring trust in the device firmware to successfully wipe all of the data, where trust in a data security context leaves one side susceptible to the mistakes of another. For example, firmware erasure algorithms may also leave out some storage areas, such as logs, bad blocks, and metadata locations that could contain sensitive information. Furthermore, it is indeed possible that the erasure may not be complete, e.g., the erasure may be performed via an overwrite or an electrical erase of the data such that some of the original data may remain on the device in some form. Additionally, there could be hardware issues such as physical defects that prevent the erasure from occurring, such as NAND pump failures, block select gate issues, and the like. Both of these approaches preserve the functionality of the device, but they require trust and functionality of the device. As a result, many facilities and users resort to destructive methods, such as drilling the ASIC and/or memory packages. While that approach is very secure when executed properly, it is clearly destructive and does not enable much in the way of reuse of the device or its subcomponents.

Securely and Reliably Erasing a Solid-State Drive

Figure 2:
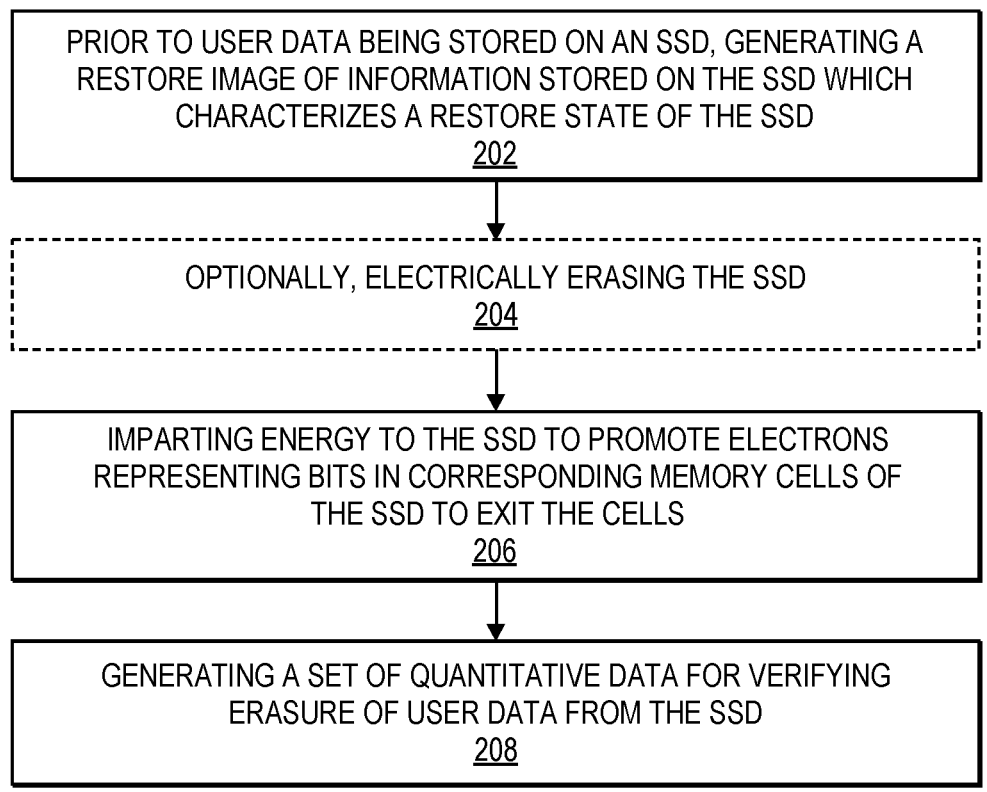
FIG. 2 is a flow diagram illustrating a method for erasing data from a solid-state drive (SSD), according to an embodiment.

FIG. 2 is a flow diagram illustrating a method for erasing data from a solid-state drive (SSD), according to an embodiment. Erasing data from the SSD (or "device" or "drive") may also generally be referred to as wiping the device, a wipe, or the like.

At block 202, prior to user data being stored on an SSD, generate a restore image of information stored on the SSD, which characterizes a restore state of the SSD. According to an embodiment, the restore image comprises a "backup" factory image of vital information, i.e., generated by the manufacturer at a manufacturing factory, as a snapshot for restoring the SSD to a factory condition or state. Such an image may comprise, for non-limiting examples, the firmware, bad block maps, configuration data, NAND ROMs, and the like. Further, this restore image may provide the added benefit of being able to restore functionality to a storage device that has gotten into a state from which it cannot readily recover.

According to an embodiment, this information represented in the restore image is provided to the customer/user via a web portal so that a device can be re-imaged after it has been thoroughly wiped of all data. For example, a simple portal could be constructed to provide for image requests based on model and serial number (and possibly other unique information written on the label) so that someone could readily acquire it at any time. Additionally and/or alternatively, if the device is formatted then this restore image (and, e.g., a recovery utility) can ship with a device by being stored on the device. In turn, the restore image could be extracted by a downloadable utility in conjunction with deploying a device. Furthermore, the restore image(s) could be sent or otherwise provided or shared in bulk to a datacenter customer. Whatever the means of providing this information to the customer, the image need only exist prior to the customer loading sensitive user data onto the device.

At optional block 204 (shown in dashed box to represent as optional), electrically erase the SSD. For example, one technique for electrically erasing the SSD is by setting a voltage level on the memory cells to a higher level than a standard operating voltage (e.g., to the highest state of the NAND, or even slightly higher) and then once the memory cells are all at this higher level/state (in a tight distribution), bringing the voltage down to zero or near-zero (e.g., an erased state, where all bits read "zero"). Alternatively, one could bring all the bits to a "one" to effectively erase the stored data. Performing this electrical wipe can lend confidence that if anything were to go wrong with subsequent process(es) (e.g., the thermal baking or X-ray processes), there is a high probability that the data is already gone anyway. Performing this electrical wipe would be expected to eliminate residual distributions in the NAND that might reveal, to some extent, what data was previously stored on the device. Note that the foregoing may apply more to SLC than other kinds of NAND (voltage) distributions.

According to an embodiment, the electrical wipe procedure may employ a small gate step and verify after each pulse (and before the first pulse) to ensure the minimum spread in the NAND distribution. Furthermore, this procedure may start out with a block-level or multi-block pulse to rapidly move the data up to a range that is near the top to accelerate the wiping process. The deeper this electrical erase (at block 204) may be, the more energy-efficient the subsequent wiping process(es) can be. However, for confidence in what input is required in subsequent process(es) (at block 206) (e.g., bake time and temperature for a thermal wipe; frequency/energy level and duration for an electromagnetic energy wipe), a shallower erase is likely more electrically achievable and more easily verified.

According to an embodiment, information (e.g., quantitative data) is collected about or relating to the electrical wipe (at block 204) of the memory cells of the SSD, which can be used to present verification of erasure of the user data from the SSD. For a non-limiting example, the number of stuck bits (e.g., bits that failed to erase), such as across some number of blocks (e.g., equidistant blocks) may be counted, averaged across the device, and presented as a device "stuck bit" metric or signature. This metric may thus provide the user a level of confidence in the degree to which the electrical wipe was effective. Furthermore, it may be that a certain density of stuck bits across some distribution of blocks may be indicative of areas in which actual data storage was not possible/probable in the first place.

At block 206, impart energy to the SSD to promote electrons representing bits in corresponding memory cells of the SSD to exit the cells. According to one embodiment, thermal energy is imparted to the SSD at block 206, e.g., thereby baking the device (generally, "treating" the device). While thermally affecting NAND is known in the context of characterization processes, such as for collecting activation energy, sector failure rate, VT (threshold voltage) shifts, and the like, and data retention baking tests are known in the context of ensuring the ability of a memory cell floating gate to retain data, at block 206 the SSD is effectively "overbaked" at a temperature and/or duration exceeding what may be typically used for device characterization and/or data retention testing.

In an electrically erasable device such as NAND memory, a floating cell is programmed by forcing electrons to tunnel through the tunnel oxide into the floating gate. Since the average energy of a solid and its components (atoms, electrons, etc.) is in direct relation with its temperature, temperature has a significant impact on the energy state of electrons in a semiconductor and, likewise, on the behavior of electronic devices. Generally, the higher the temperature, the more thermal energy is available for use by the atoms and electrons, which promotes more electrons from lower states to higher states. More specifically, on one side of the energy barrier of a floating gate memory cell there are electrons with a distribution of energies. Some have enough energy to escape over the top of the barrier and, as the temperature is raised, more electrons achieve the energy required to overcome the tunnel oxide barrier. Here at block 206, the energy imparted to the SSD is intended to intentionally promote the trapped electrons to a high enough energy state to exit the memory cells by overcoming or leaving or essentially "jumping over" the tunnel oxide barrier and, thereby, effectively rendering the memory cell erased. Furthermore, the SSD may be (iteratively) treated as at block 206, the current level of erasure determined or verified or confirmed, and then treatment at block 206 repeated if necessary responsive to the SSD(s) not reaching the desired level of erasure, iterating until the desired (certain) level of erasure is achieved.

Another form of non-volatile memory is phase change memory (PCM), which stores data by changing the state of the material used between amorphous and crystalline states. The amorphous state corresponds to a disordered phase, whereby the material has relatively high electrical resistance, where the crystalline state corresponds to an ordered phase, whereby the material has relatively less resistance. Thus, the approaches described throughout herein are further contemplated for thermally treating a data storage device containing and utilizing phase change memory, for erasing such memory.

According to an embodiment, a thermal profile corresponding to the SSD is provided (e.g., to the party performing the process of FIG. 2), where the thermal profile characterizes or specifies temperatures versus durations (e.g., ranges of each) for promoting the electrons to exit the cell for thermal erasure purposes. For example, based on what temperature the user is interested in utilizing, an activation energy for that corresponding temperature range can be selected and a necessary duration to bake can be projected. Such thermal profiles may enable the input of or correlation with various factors, such as the age of the NAND, electrical wipe conditions, previous bakes, and the like, as well as the desired level of erasure up to and including the lowest threshold voltage that a flash device can go.

In a practical context, a user may prefer to treat multiple SSDs at a time rather than individually. For a non-limiting example, one may place the multiple devices into a chamber in the exhaust path of a datacenter (e.g., for environmental impact efficiency purposes), where it could be highly variable as to how much thermal baking was imparted on each device and, thus, how long one administers the treatment could vary. Further variables include the likelihood that each NAND may have different inherent characteristics, different devices would have different levels of wear associated with them, and the like, all of which may impact treatment time. Thus, the aforementioned iterative treating approach may be especially beneficial in such an SSD group treatment context.

According to another embodiment, high-energy electromagnetic radiation waves is/are imparted to the SSD at block 206 to promote electrons representing bits in corresponding memory cells of the SSD to exit the cells. According to an embodiment, X-rays are imparted to the SSD for this purpose. One manner in which to characterize the electromagnetic (EM) spectrum is based on corresponding photon energies, measured in electron volts (eV), where X-ray photons are commonly considered those having energies in the range 100 eV to 100,000 eV (or 100 keV), or wavelengths in the range 0.01-10 nm (nanometers) and thus frequencies in the range $3\times10^{19}$-$3\times10^{16}$ Hz (hertz) (i.e., 30 petahertz to 30 exahertz). Like thermal energy, X-rays too can significantly impact the energy state of electrons in a semiconductor and, thereby, promote electrons to higher energy states so as to achieve the energy required to overcome the tunnel oxide barrier to effectively render the memory cells erased. Similarly as with thermal profiles, according to an embodiment an electromagnetic (EM) radiation profile corresponding to the SSD is provided, where the EM radiation profile characterizes or specifies EM energy levels versus durations (e.g., ranges of each) for promoting the electrons to exit the cell for EM erasure purposes.

In either type of treatment (e.g., thermal and high-energy EM) there are certain cells, such as those that contain NAND parameters, manufacturing dates, and the like (non-user data) that one may not want to erase. While the recovery information corresponding to the restore image (block 202) can help with the NAND parameters, according to an embodiment, these cells may be pre-conditioned or elevated to a higher voltage such that they would more likely survive the further treatment and still have information remaining (e.g., uncycled), whereas the user data would be fully wiped. This could serve as an alternative implementation to generating the restore image at block 202. Furthermore, responsive to employing the aforementioned iterative treatment, these cells could be "touched up" at each erasure confirmation activity. Touching up generally involves taking a reading (i.e., sense) of their threshold voltages and then applying an appropriate voltage to program them up to a target verify, effectively like a normal program, but with tighter requirements and finer stepping. Similarly, there are select gates on every block that do not contain information, but do have their thresholds set by charge in the NAND charge trap layer (e.g., they are effectively NAND cells that have different voltages but do not convey information), and which would need to be restored to the proper threshold voltage for proper functioning.

At block 208, generate a set of quantitative data (generally, information) for verifying the erasure of user data from the SSD. As discussed, the trustworthiness of digital data erasure is considered important, especially in the context of storage device (e.g., SSD) reuse and recycling. Hence, a robust statistical verification of data erasure can help instill trust that the erasure process was suitably successful. For example and as described elsewhere herein, according to an embodiment, quantitative data is collected about or relating to the optional electrical wipe (at block 204) of the memory cells of the SSD, which can be used to present verification of erasure of the user data from the SSD. Here further and according to an embodiment, quantitative data is collected about or relating to the thermal and/or high-energy radiation wipe (at block 206) of the memory cells of the SSD, which can be used to present verification of erasure of the user data from the SSD. In each case, generating quantitative data for verifying erasure at block 208 may include generating such quantitative data relating to either or both the electronic wipe, if implemented, and the thermal and/or high-energy radiation wipe.

According to embodiments, such quantitative data may include, for non-limiting examples, (i) how many cells failed to read erase out of the total cells (the number of "stuck bits", which were most likely also stuck at time of data programming and thus convey nothing about their intended value), (ii) the distribution of sectors with cells that contain non-erased data, (iii) counts of stuck cells/columns, as can be detected by looking for the same cell being stuck in multiple wordlines/columns, (iv) counts of stuck wordlines/blocks, as can be detected by looking at wordlines or blocks that did not erase, (v) differentiation between cells in factory bad blocks that never held user data and blocks that have held user data, and (vi) differentiation between cells that failed to read as erased due to broken blocks/columns/wordlines, where such cells would actually be erased responsive to being baked/zapped properly but where it would not be possible for them to read as erased. Further, "before and after" data (e.g., bitmaps representing the distribution of stuck bits), relative to either or both electrical erasure (block 204) and thermal/EM erasure (block 206), may be valuable in convincing the customer of the success of the erasure, such as in cases in which a user-specified threshold was exceeded and thus the user may want additional data to decide for themselves whether data was sufficiently wiped. For example, if statistics are collected on the bits at the start of the process, after moving all of the bits up to an elevated state electrically, after moving all of the bits to a lower state electrically, and/or after thermally/x-ray wiping the drive, the user could gain confidence by seeing that their actual programmed data (e.g., excluding stuck bits) was indeed erased by this process.

Finally, after the foregoing data wipe process(es) concludes, the restore image from block 202 may be loaded to the necessary locations on the wiped SSD to restore functionality.

As reliable and trustworthy data erasure of an SSD is largely ensured through the foregoing process(es), such wiped SSDs can then be reused/repurposed/refurbished by the same user or by additional users if such devices are resold or otherwise transferred. Furthermore, such wiped SSDs could be recycled so that valuable components such as NAND and DRAM may find a new use in other products.

Solid State Drive Configuration

As discussed, embodiments may be used in the context of solid-state drives (SSDs). Thus, FIG. 1 is a block diagram illustrating an example operating context with which embodiments of the invention may be implemented. FIG. 1 illustrates a generic SSD architecture 150, with an SSD 152 communicatively coupled with a host 154 through a primary communication interface 156 ("primary interface 156"). Embodiments are not limited to a configuration as depicted in FIG. 1, rather, embodiments may be implemented with SSD configurations other than that illustrated in FIG. 1. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be embodied in a hardware machine on which executable code executes (for non-limiting examples, a computer or hardware server, and the like), or as software instructions executable by one or more processors (for non-limiting examples, a software server such as a database server, application server, media server, and the like). Host 154 interacts with SSD 152 via the primary interface 156 (e.g., a physical and electrical I/O interface) for transferring data to and from the SSD 152, such as via a network such as Ethernet or Wi-Fi or a communication bus standard such as Serial Advanced Technology Attachment (SATA), PCI (Peripheral Component Interconnect) express (PCIe), Small Computer System Interface (SCSI), or Serial Attached SCSI (SAS), for non-limiting examples. Host 154 may be an operating system executing on a computer, a tablet, a mobile phone, or generally any type of computing device that contains or interacts with memory. In that case, the primary interface 156 coupling host 154 to SSD 152 may be, for example, a storage system's internal bus or a communication cable or a wireless communication link, or the like.

The example SSD 152 illustrated in FIG. 1 includes an interface 160, a controller 162 (e.g., a controller having firmware logic therein), an addressing 164 function block, data buffer cache 166, and one or more non-volatile memory components 170*a*, 170*b*-170*n*.

Interface 160 is a point of interaction between components, namely SSD 152 and host 154 in this context, and is applicable at the level of both hardware and software. This enables a component to communicate with other components via an input/output (I/O) system and an associated protocol. A hardware interface is typically described by the mechanical, electrical and logical signals at the interface and the protocol for sequencing them, such as the aforementioned common and standard interfaces including SATA, PCIe, SCSI, and SAS.

An SSD 152 includes a controller 162, which incorporates the electronics that bridge the non-volatile memory components to the host, such as non-volatile memory 170*a*, 170*b*, 170*n* to host 154. A controller is typically an embedded processor that executes firmware-level code and is an important factor in SSD performance. Processing, functions, procedures, actions, method steps, and the like, that are described herein as being performed or performable by a storage device controller such as controller 162, may include enactment by execution of one or more sequences of instructions stored in one or more memory units and which, when executed by one or more processors, cause such performance. For example, and according to an embodiment, the controller 162 may comprise an application-specific integrated circuit (ASIC) comprising at least one memory unit for storing such instructions (such as firmware, for a non-limiting example) and at least one processor for executing such instructions. More broadly, SSD controller 162 may be embodied in any form of and/or combination of software, hardware, and firmware. An electronic controller in this context typically includes circuitry such as one or more processors for executing instructions, and may be implemented as System On a Chip (SoC) electronic circuitry, which may include a memory, a microcontroller, a Digital Signal Processor (DSP), an ASIC, a Field Programmable Gate Array (FPGA), hard-wired logic, analog circuitry and/or a combination thereof, for non-limiting examples. Firmware, i.e., executable logic (e.g., programming code) which may be stored in or read into SSD volatile memory 171, includes machine-executable instructions for execution by the controller 162 in operating each SSD 152.

Controller 162 interfaces with non-volatile memory 170*a*, 170*b*, 170*n* via an addressing 164 function block. The addressing 164 function operates, for example, to manage mappings between logical block addresses (LBAs) from the host 154 to a corresponding physical block address on the SSD 152, namely, on the non-volatile memory 170*a*, 170*b*, 170*n* of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 171, such as DRAM (dynamic random-access memory) or some other local volatile memory component accessible to controller 162 and addressing 164. Alternatively, the table structure may be maintained more persistently across sessions in the SSD's non-volatile memory such as non-volatile memory 170*a*, 170*b*-170*n*.

Addressing 164 interacts with data buffer cache 166, in addition to non-volatile memory 170*a*, 170*b*-170*n*. Data buffer cache 166 of an SSD 152 typically uses DRAM as a cache, similar to the cache in hard disk drives. Data buffer cache 166 serves as a buffer or staging area for the transmission of data to and from the non-volatile memory 170*a*, 170*b*-170*n* components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes the one or more non-volatile memory 170*a*, 170*b*-170*n* components. For a non-limiting example, the non-volatile memory components 170a, 170b-170n may be implemented as flash memory (e.g., NAND (NOT-AND) or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the magnetic-recording media disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD combined with an SSD (see, e.g., SSD 152) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for erasing data from a solid-state drive (SSD), the method comprising:
   prior to user data being stored on the SSD, generating a restore image of information stored on the SSD which characterizes a restore state of the SSD;
   imparting energy to the SSD to promote electrons representing bits in corresponding memory cells of the SSD to exit the cells, wherein imparting energy to the SSD comprises imparting at least one of thermal energy or high-energy electromagnetic radiation waves to the SSD; and
   generating a set of quantitative data for verifying erasure of user data from the SSD.

2. The method of claim 1, further comprising:
   prior to imparting energy to the SSD, electrically erasing the SSD by setting a voltage level on the memory cells to a higher level than a standard operating voltage and then bringing the voltage to near-zero.

3. The method of claim 2, further comprising:
   collecting quantitative data relating to the electrically erasing of the memory cells; and
   wherein generating the set of quantitative data comprises including the quantitative data relating to the electrically erasing in the set of quantitative data.

4. The method of claim 1, further comprising:
   providing the restore image to a user of the SSD.

5. The method of claim 1, wherein imparting energy to the SSD to promote the electrons includes imparting thermal energy to the SSD.

6. The method of claim 5, further comprising:
   providing a thermal profile, corresponding to the SSD, characterizing temperatures versus durations for promoting the electrons to exit the cells.

7. The method of claim 1, wherein imparting energy to the SSD to promote the electrons includes imparting high-energy electromagnetic radiation waves to the SSD.

8. The method of claim 7, further comprising:
   providing an electromagnetic radiation profile, corresponding to the SSD, characterizing electromagnetic energy levels versus durations for promoting the electrons to exit the cells.

9. The method of claim 1, further comprising:
   collecting quantitative data relating to the imparting energy to the memory cells of the SSD; and
   wherein generating the set of quantitative data comprises including the quantitative data relating to the imparting energy in the set of quantitative data.

10. The method of claim 1, wherein imparting energy to the SSD to promote the electrons comprises:
    imparting energy to a group of multiple SSDs to promote the electrons representing bits in corresponding memory cells of the SSDs to exit the cells;
    identifying a subset of the group of SSDs determined to have not reached a certain level of erasure; and
    imparting increased energy to the subset of SSDs.

11. The method of claim 1, further comprising:
    prior to imparting energy to the SSD, pre-conditioning certain cells of the SSD by elevating to a higher voltage so that the electrons corresponding to these certain cells are less likely to exit; and
    subsequent to imparting energy to the SSD, returning the certain cells to a desired threshold voltage.

12. A method for erasing data from a solid-state drive (SSD), the method comprising:
    prior to user data being stored on the SSD, generating a restore image of information stored on the SSD which characterizes a restore state of the SSD;
    electrically erasing memory cells of the SSD;

collecting quantitative data relating to the electrically erasing of memory cells of the SSD;

imparting thermal energy to the SSD to promote electrons between insulator layers and representing bits in corresponding memory cells of the SSD to exit the cells;

collecting quantitative data relating to the imparting the thermal energy to the memory cells of the SSD; and generating a set of quantitative data for verifying erasure of user data from the SSD.

13. The method of claim 12, wherein generating the set of quantitative data comprises including the quantitative data relating to the electrically erasing and the quantitative data relating to imparting the thermal energy in the set of quantitative data.

14. The method of claim 12, further comprising:
providing a thermal profile, corresponding to the SSD, characterizing temperatures versus durations for promoting the electrons to exit the cells.

15. The method of claim 12, wherein generating the set of quantitative data includes generating a number of cells whose bit value did not change from the imparting of thermal energy.

16. A method for erasing data from a solid-state drive (SSD), the method comprising:
prior to user data being stored on the SSD, generating a restore image of information stored on the SSD which characterizes a restore state of the SSD;
electrically erasing memory cells of the SSD;
collecting quantitative data relating to the electrically erasing of memory cells of the SSD;
imparting high-energy electromagnetic radiation waves to the SSD to promote electrons between insulator layers and representing bits in corresponding memory cells of the SSD to exit the cells;
collecting quantitative data relating to the imparting the high-energy electromagnetic radiation to the memory cells of the SSD; and
generating means for verifying erasure of user data from the SSD.

17. The method of claim 16, wherein generating the set of quantitative data comprises including the quantitative data relating to the electrically erasing and the quantitative data relating to imparting the high-energy electromagnetic radiation in the set of quantitative data.

18. The method of claim 16, wherein imparting the high-energy electromagnetic radiation waves includes imparting X-rays to the SSD.

19. The method of claim 16, further comprising:
providing an electromagnetic radiation profile, corresponding to the SSD, characterizing electromagnetic energy levels versus durations for promoting the electrons to exit the cells.

20. The method of claim 16, wherein generating the set of quantitative data includes generating a number of cells whose bit value did not change from the imparting of high-energy electromagnetic radiation.

* * * * *